United States Patent
Shirashyad et al.

(10) Patent No.: US 11,943,366 B2
(45) Date of Patent: *Mar. 26, 2024

(54) EFFICIENT TRANSFER OF AUTHENTICATION CREDENTIALS BETWEEN CLIENT DEVICES

(71) Applicant: Okta, Inc., San Francisco, CA (US)

(72) Inventors: Chandra Shirashyad, Fremont, CA (US); Ildar Abdullin, Dublin, CA (US); Umang Shah, Fremont, CA (US); Naveen Kumar Keerthy, San Jose, CA (US); Cedric Beust, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,372

(22) Filed: Dec. 19, 2022

(65) Prior Publication Data

US 2023/0198768 A1 Jun. 22, 2023

Related U.S. Application Data

(63) Continuation of application No. 17/094,344, filed on Nov. 10, 2020, now Pat. No. 11,595,214.

(51) Int. Cl.
*H04L 29/06* (2006.01)
*H04L 9/08* (2006.01)
(Continued)

(52) U.S. Cl.
CPC .......... *H04L 9/3234* (2013.01); *H04L 9/0825* (2013.01); *H04L 9/3228* (2013.01);
(Continued)

(58) Field of Classification Search
CPC ... H04L 9/3234; H04L 9/0825; H04L 9/3228; H04L 9/3231; H04L 2209/127; H04L 2209/80; H04W 4/80
See application file for complete search history.

(56) References Cited

U.S. PATENT DOCUMENTS 9,038,152 B1 * 5/2015 Vazquez ................. H04L 63/08
    726/8
10,045,174 B1 * 8/2018 Rao ......................... H04W 4/50
(Continued)

FOREIGN PATENT DOCUMENTS

WO    WO-2015061992 A1 *  5/2015  ........... H04L 63/061
WO    WO-2016076913 A1 *  5/2016  ............. H04L 63/08

OTHER PUBLICATIONS

PCT International Search Report and Written Opinion, PCT Application No. PCT/US2021/058761, dated Feb. 24, 2022, nine pages.

*Primary Examiner* — Shawnchoy Rahman
(74) *Attorney, Agent, or Firm* — Holland & Hart LLP

(57) ABSTRACT

An authentication system facilitates a transfer of enrollment in authentication services between client devices. The authentication system enrolls a client device in authentication services to enable the client device to be used for authenticating requests to access one or more services. As part of enrolling the client device, the authentication system receives authentication enrollment information for the client device that is associated with one or more authentication credentials securely stored on the client device (e.g., a multi-factor authentication (MFA) certificate). The authentication system facilitates one or more processes for transferring the enrollment from an enrolled client device to a non-enrolled client device that limit the number and complexity of actions performed by the user. In particular, the authentication system facilitates transfer of enrollment based on receiving enrollment transfer requests authorized by the enrolled client device using one or more authentication credentials associated with the enrollment of the enrolled client device.

20 Claims, 5 Drawing Sheets

(51) Int. Cl.
  *H04L 9/32* (2006.01)
  *H04W 4/80* (2018.01)
(52) U.S. Cl.
  CPC ............ *H04L 9/3231* (2013.01); *H04W 4/80* (2018.02); *H04L 2209/127* (2013.01); *H04L 2209/80* (2013.01)

(56) References Cited

U.S. PATENT DOCUMENTS

| | | |
|---|---|---|
| 11,595,214 B2 | 2/2023 | Shirashyad et al. |
| 2014/0189808 A1 | 7/2014 | Mahaffey et al. |
| 2015/0016694 A1 | 1/2015 | Kerr |
| 2015/0229475 A1* | 8/2015 | Benoit .................... H04L 63/20 713/168 |
| 2016/0112389 A1 | 4/2016 | Bortolamiol |
| 2016/0255092 A1 | 9/2016 | Adams et al. |
| 2016/0294842 A1 | 10/2016 | Ramalingam et al. |
| 2017/0300704 A1 | 10/2017 | Subramanian et al. |
| 2018/0096354 A1* | 4/2018 | Kohli ...................... G06F 21/32 |
| 2018/0174138 A1* | 6/2018 | Subbarayan ......... G06Q 20/385 |
| 2018/0343551 A1* | 11/2018 | Rao ...................... G06F 9/44505 |
| 2019/0098001 A1 | 3/2019 | Yang et al. |
| 2020/0106761 A1 | 4/2020 | Nath et al. |
| 2021/0036859 A1* | 2/2021 | Sukhomlinov ....... H04L 9/3273 |
| 2021/0076204 A1* | 3/2021 | Goyal ................... H04L 67/306 |
| 2022/0101306 A1 | 3/2022 | Rule et al. |

* cited by examiner

EFFICIENT TRANSFER OF AUTHENTICATION CREDENTIALS BETWEEN CLIENT DEVICES

RELATED APPLICATIONS

This application is a continuation of U.S. patent application Ser. No. 17/094,344, filed on Nov. 10, 2020, which is hereby incorporated by reference.

FIELD OF ART

The present invention generally relates to the field of software applications, and more specifically, to transferring authentication credentials between client devices.

BACKGROUND

Authentication systems often use authentication techniques that rely on client devices enrolled in authentication services to authenticate requests for access to services, such as to provide authentication factors for multi-factor authentication (MFA). These authentication systems may exchange information corresponding to authentication credentials with the client devices during an authentication enrollment process that can be used to authenticate access requests. In order to mitigate security risks, some or all of the authentication credentials may be securely stored on enrolled client devices and inaccessible to other systems (e.g., the authentication systems), such as using a trusted platform module (TPM) or other cryptographic storage techniques. This secure storage prevents the authentication credentials from being accessed by users of the enrolled client device or by other devices or systems.

However, users of client devices enrolled in authentication services with authentication systems routinely acquire new client devices, such as new mobile devices, which they desire to use for authentication through the same authentication systems. Because the authentication credentials are securely stored on the enrolled client devices, enrolling new client devices is a difficult and inefficient process. For instance, enrolling a new device in place of an enrolled device may involve many manual steps that can be time-consuming, error-prone, or necessitate human intervention. These manual steps may include a user accessing an online interface (e.g., using a separate computing device) by authenticating via the enrolled device and manually unenrolling the enrolled client device through the online interface. As another example, enrolling the new device may require an administrator of the authentication system unenrolling the enrolled client device so that the new device can be subsequently enrolled. As such, improved techniques for enrolling a new device in authentication services in place of a previously enrolled device are needed.

SUMMARY

An authentication system facilitates a transfer of enrollment in authentication services between client devices. The authentication system enrolls a client device in authentication services to enable the client device to be used for authenticating requests to access one or more services. As part of enrolling the client device, the authentication system receives authentication enrollment information for the client device that is associated with one or more authentication credentials securely stored on the client device (e.g., a multi-factor authentication (MFA) certificate). The authentication system facilitates one or more processes for transferring the enrollment from an enrolled client device to a non-enrolled client device that limit the number and complexity of actions performed by the user. In particular, the authentication system facilitates transfer of enrollment based on receiving enrollment transfer requests authorized by the enrolled client device using one or more authentication credentials of the enrolled client device (e.g., a public/private key pair of an MFA certificate) associated with the enrollment of the enrolled client device. In transferring the enrollment, the authentication system updates authentication information for the enrolled client device to be associated with one or more authentication credentials of the non-enrolled client device in place of the one or more authentication credentials of the enrolled client device. The authentication system may further request information verifying the presence of a user associated with the enrolled client device in order to transfer the enrollment information (e.g., a password or biometric information).

In some embodiments, the authentication system associates authentication enrollment information with a first client device, the authentication enrollment information associated with a first authentication credential securely stored on the first client device for authenticating access requests through the authentication system. The authentication system receives, from the first client device, a request to transfer enrollment of the first client device to a second client device. In particular, the request is authorized by the first client device based on the first authentication credential and includes information corresponding to a second authentication credential securely stored on the second client device and provided by the second client device to the first client device over a personal area network. Based on the authorized enrollment transfer request, the authentication system associates the authentication enrollment information with the second client device, the associating including associating the second authentication credential with the authentication enrollment information in place of the first authentication credential based on the received information. The authentication system provides confirmation of the enrollment transfer to the first client device.

In some embodiments, the authentication system associates authentication enrollment information with a first client device, the authentication enrollment information associated with a first authentication credential securely stored one the first client device for authenticating access requests through the authentication system. Responsive to receiving, from the first client device, a request to transfer enrollment of the first client device to a second client, the authentication system provides a transfer authorization token to the first client device. The authentication system receives, from the second client device, the transfer authorization token. Responsive to validating the transfer authorization token, obtaining, from the second client device, information corresponding to a second authentication credential securely stored on the second client device. The authentication system associates the authentication enrollment information with the second client device, the associating including associating the second authentication token with the authentication enrollment information in place of the first authentication credential based on the received information. The authentication system provides confirmation of the enrollment transfer to the first and second client devices.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
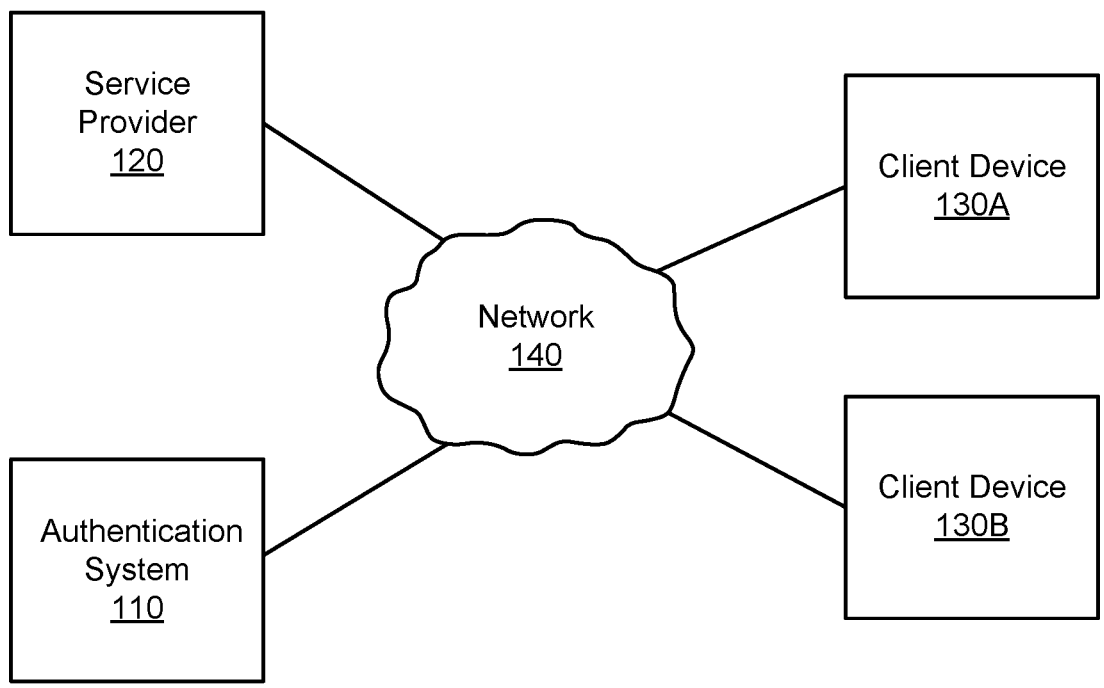
FIG. 1 is a block diagram illustrating a computing environment for transferring enrollment in authentication services between client devices, according to one embodiment.

FIG. 1 is a block diagram illustrating one embodiment of a computing environment 100 for transferring enrollment in authentication services between client devices (e.g., client device 130A and 130B). In the embodiment shown, the computing environment 100 includes an authentication system 110 that provides authentication using client devices 130, a service provider 120 that provides services in response to access requests authenticated using the client devices 130, client devices 130 that are enrolled in authentication services of the authentication system 110, and a network 140 that enables communication between the various components of FIG. 1. In some embodiments, a user of one or more of the client devices 130 is a member of an organization (e.g., an employee of a corporation) that contracts with the authentication system 110 to handle authentication on behalf of the members of the organization to access services of the service provider 120, which can include internal services of the organization (e.g., an enterprise network or suite of applications) or third-party services used by the organization. Example third-party services include SALESFORCE, MICROSOFT OFFICE 365, SLACK, DOCUSIGN, ZOOM, or the like. In different embodiments, the computing environment 100 and its components may include different or additional elements than those illustrated in FIGS. 1-2. Furthermore, the functionality may be distributed among the elements in a different manner than described. The components of FIG. 1 are now described in more detail.

The authentication system 110 authenticates requests for access to services of the service provider 120 (i.e., access requests). In particular, the authentication system 110 uses a client device that is enrolled in authentication services with the authentication system 110 (e.g., the enrolled client device 130A) in order to authenticate requests for services associated with the enrolled client device. The authentication system 110 may be an authentication platform providing various authentication services for accessing services of service providers, such as single sign-on capabilities, multi-factor authentication (MFA), identity proofing, application programming interface access management, or other authentication services. During enrollment of a client device 130 the client device 130 generates enrollment information including authentication credentials of the client device and provides some or all of the enrollment information to the authentication system 110. Authentication credentials are data values used by an enrolled client device that enable the enrolled client device to prove its identity to the authentication system 110. Authentication credentials can include authentication certificates (e.g., MFA certificates), authentication/encryption keys (e.g., shared secret keys or public/private key pairs) various hardware security tokens, software security tokens, other authentication credentials, or any combination thereof. Some authentication credentials used by a client device 130 may be accessible to external systems (i.e., public authentication credentials), such as a public key, while others may only be accessible to the client device 130 (i.e., private authentication credentials), such as a private key. In embodiments, the authentication credentials are associated with a client device during enrollment of the client device in authentication services of the authentication system 110. For example, the client device 130 may generate an authentication certificate including a public/private encryption key pair and provide the public key to the authentication system 110. Enrollment information can additionally include other information used by the authentication system 110 to authenticate client devices 130, such as characteristics of the client device 130 (e.g., IP address, geographic location, version, etc.), information describing a user associated with the client device 130 (e.g., name, age, email, etc.), or various authentication factors (e.g., passwords, secret questions, etc.). The authentication system 110 further provides one or more processes to users associated with the client devices 130 to transfer authentication credentials from an enrolled client device 130 (e.g., the client device 130A) to a new non-enrolled client device 130 (e.g., the client device 130B). The one or more transference processes provided by the authentication system 110 are described in greater detail below with reference to FIGS. 2-4.

The service provider 120 provides services to computing devices or systems in response to successful authentication of requests for access to services (i.e., access requests) by the authentication system 110. As described above with reference to the system environment 100, in some embodiments the service provider 120 provides access to internal services of an organization of which a user of the client device 130 is a member. In the same or different embodiments, the service provider 120 provides access to services of one or more third-party service providers. The service provider 120 communicates with the authentication system 110 to authenticate access requests by users of the service provider 120. In embodiments, the service provider 120 receives authentication responses from the authentication system 110 including information indicating whether or not an access request was successfully authenticated. Based on the received authentication responses, the service provider 120 determines whether or not to provide access to requested services. In some embodiments, the authentication system 110 is a component of the service provider 120.

The client devices 130 (e.g., the client devices 130A and 130B) are computing devices that can be enrolled in authentication services of the authentication system 130 to authenticate access requests for services of the service provider 120. For instance, a client device 130 can be a desktop computer, a laptop computer, a mobile device (e.g., a mobile phone, a tablet, etc.), or any other device suitable to execute the client application 125. In embodiments, the client devices 130 generate enrollment information in order to enroll in authentication services of the authentication system 110, including authentication credentials to use for authenticating through the authentication system 110. The client devices 130 store the authentication credentials in secure storage. The term "secure storage," as used herein, refers to storage of data that can only be accessed by authorized systems or processes. The client devices 130 further communicate with the authentication system 110 in order to transfer enrollment between client devices 130 (e.g., enrolling the client device 130B in place of client device 130A). In order to facilitate transfer of enrollment, the client devices 130 are configured to authorize the transfer on the enrolled device (i.e., the client device 130 enrolled at the start of the transfer) or the non-enrolled device (i.e., the client device 130 enrolled at the end of the transfer). Techniques for authorizing the enrollment transfer on the enrolled or non-enrolled client devices are described in greater detail below with reference to FIGS. 2-4. Some or all of the processes on the client devices 130 relating to authentication through the authentication system 110 may be facilitated by software associated with the authentication system 110 on the client devices 130 (e.g., a client-side authentication application or process). Although only two client devices 130 are depicted in FIG. 1, this is done in order to illustrate at least an enrolled client device (e.g., the client device 130A) and a non-enrolled client device (e.g., the client device 130B), and the computing environment 100 can include any number of enrolled or non-enrolled client devices 130.

In some embodiments, the client devices 130 securely store authentication credentials on a cryptographic microprocessor of the client devices 130 (e.g., as part of a keychain), such as a trusted platform module (TPM). In these embodiments, the cryptographic microprocessor may use a variety of cryptographic algorithms to encrypt the authentication credentials, such as the Rivest-Shamir-Adleman (RSA) algorithm, the secure hash algorithm 1 (SHA1), or Hash based Message Authentication Code (HMAC). As part of securely storing the authentication credentials in the cryptographic microprocessor, a client device 130 and the authentication system 110 may exchange encryption information (e.g., public keys of respective public/private key pairs) to enable the client device 130 to authenticate with the authentication system 110 using authentication credentials of the client device 130. As an example, the client devices 130 may securely store private authentication credentials using TPM in order to prevent other systems from accessing the private authentication credentials.

The network 140 connects the authentication system 110, the service provider 120, and the client devices 130. The network 140 may be any suitable communications network for data transmission. In an embodiment such as that illustrated in FIG. 1, the network 140 uses standard communications technologies or protocols and can include the interne. In another embodiment, the entities use custom or dedicated data communications technologies.

Figure 2:
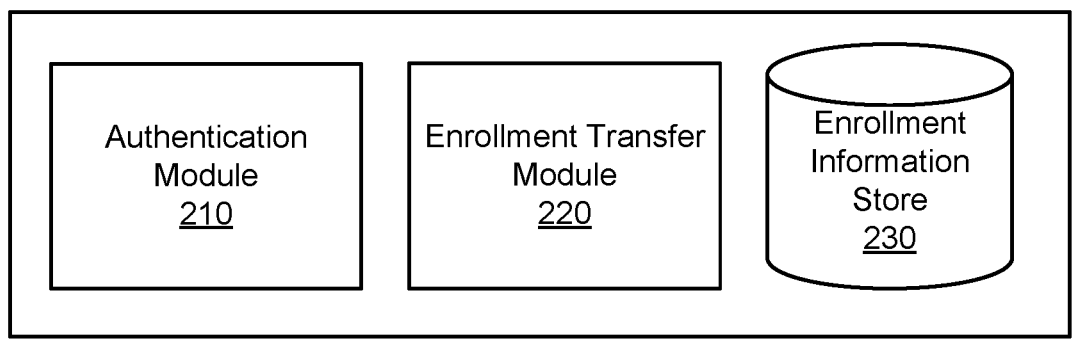
FIG. 2 is a block diagram illustrating one embodiment of an authentication system, according to one embodiment.

FIG. 2 is a block diagram illustrating one embodiment of the authentication system 110. In the embodiment shown, the authentication system 110 includes an authentication module 210 that authenticates client devices 130, an enrollment transfer module 220 that transfers enrollment from enrolled client devices 130 to non-enrolled client devices 130, and an enrollment information store 230 that stores enrollment information for client devices 130. The components of FIG. 2 are now described in more detail.

The authentication module 210 authenticates access requests (e.g., for services of the service provider 120) using enrolled client devices 130. In embodiments, the authentication module 210 enrolls client devices 130 in authentication services provided by the authentication module 210. In particular, the authentication module 210 associates enrollment information with the enrolled client device 130 (e.g., stored in the enrollment information store 230). The enrollment information associated with an enrolled client device 130 can include authentication credentials (e.g., a public encryption key) generated by the enrolled client device 130 and provided to the authentication system 110. The authentication module 210 may enroll a client device 130 in authentication services in response to receiving an enrollment request from the client device 130. After enrolling a client device 130 in authentication services, the authentication module 210 receives requests to access services that are associated with the enrolled client device 130 (e.g., provided by a user of the enrolled client device 130 on the enrolled client device 130 or on another computing device). The authentication module 210 uses the enrolled client device 130 to authenticate the access request, such as requesting authentication information (e.g., an MFA factor) from the enrolled client device 130 (e.g., via an MFA push challenge) generated using authentication credentials to authenticate the client devices 130.

In some embodiments, the authentication services provided by the authentication module 210 include MFA. In this case, the authentication module 210 receives authentication factors from enrolled client devices 130 generated using the authentication credentials. For instance, the authentication credentials of an enrolled client device 130 can include a public/private key pair (e.g., of an MFA certificate) used to sign a payload of authentication-related information to provide as an authentication factor to the authentication system 110. The authentication module 210 may request various numbers of authentication factors from an enrolled client device 130, such an initial authentication factor, a secondary authentication factor, a tertiary authentication factor, etc. Furthermore, as part of the MFA authentication process, the authentication module 210 may solicit various types of authentication factors from a client device 130, such as possession factors (e.g., software tokens), user knowledge factors (e.g., passwords, secret question answer, etc.), inherent factors (e.g., an identifier of an enrolled client device 130 or biometric data for a user of the client device 130), location-based factors (e.g., a GPS coordinate of the enrolled client device 130), or any other suitable MFA authentication factor.

The enrollment transfer module 220 facilitates transfer of enrollment of an enrolled client device 130 (e.g., the client device 130A) to a non-enrolled client device 130 (e.g., the client device 130B). In particular, the enrollment transfer module 220 facilitates updating or replacing enrollment information for the enrolled client device with enrollment information for the non-enrolled client device. In embodiments, the enrollment transfer module 220 receives a request to transfer enrollment of an enrolled client device 130 to a non-enrolled client device 130 (herein an "enrollment transfer request"). The enrollment transfer request is received from the enrolled client device 130 and authorized by the enrolled client device 130 using authentication credentials associated with enrollment information for the enrolled client device 130 (e.g., signed using a private key). For example, a user of the enrolled client device may interact with a user interface associated with the authentication system 110 on the non-enrolled client device 130 or the enrolled client device 130 to submit the enrollment transfer request. Responsive to the enrollment transfer request, the enrollment transfer module 220 communicates with the enrolled client device and the non-enrolled client device in order to replace enrollment information associated with the enrolled client device with enrolment information associated with the non-enrolled client device. In particular, the enrollment transfer module 220 receives enrollment information for the non-enrolled client device including authentication credentials generated by the non-enrolled client device 130. The enrollment transfer module 220 associates the enrollment information for the non-enrolled client device 130 with the non-enrolled client device 130 in place of some or all of the enrollment information for the enrolled client device 130 (e.g., stored in the enrollment information store 230). The enrollment information associated with the non-enrolled client device 130 includes one or more authentication credentials of the non-enrolled client device that replace of one or more authentication credentials of the enrolled client device. For example, the enrollment module 220 may replace a public key of the enrolled client device with a public key of the non-enrolled client device. The enrollment transfer module 220 may further notify the enrolled client device 130 or the non-enrolled client device 130 indicating that the enrollment was or was not successfully transferred. After the enrollment transfer module 220 completes the transfer of enrollment to the previously non-enrolled client device 130, the non-enrolled client device can be used for authenticating relevant access requests by the authentication system 110 (e.g., to access services of the service provider 120).

In some embodiments, the enrolled client device 130 and the non-enrolled client device 130 communicate via a personal area network (e.g., Bluetooth, ZigBee, etc.) in order to initiate the transfer of enrollment by the enrollment transfer module 220. In this case, the non-enrolled client device 130 can request authorization of the transfer of enrollment from the enrolled client device 130 over the personal area network, or vice versa. For example, a user of both the enrolled client device and the non-enrolled client device can pair the enrolled and non-enrolled client devices via a personal area network and interact with the non-enrolled device to request authorization of the enrollment transfer request from the non-enrolled client device via the personal area network. Similarly, the user can interact with the enrolled client device to provide authorization of the transfer to the enrolled client device (e.g., via a user interface). After authorizing the enrollment transfer request from the non-enrolled client device 130, the enrolled client device 130 provides authorization to the non-enrolled client device 130 that includes enrollment information for the enrolled client device 130, such as an identifier of the enrolled client device 130 or a public key of the enrolled client device 130 associated with enrollment information at the authentication system 110. After the enrolled client device 130 provides authorization to the enrolled client device, the non-enrolled client device 130 can use the enrollment information for the enrolled client device 130 to generate new enrollment information for the non-enrolled client device 130. In particular, the non-enrolled client device 130 can generate one or more authentication credentials (e.g., an MFA certificate with a public/private key pair) for communicating with the authentication system 110 to replace authentication credentials used by the enrolled client device 130. Some or all of the new enrollment information for the client device 130B is provided to the enrollment transfer module 220 to replace enrollment information associated with the enrolled client device 130, such as a public key of the non-enrolled client device 130. The enrolled client device 130 or the non-enrolled client device 130 may further provide information indicating the authorization of the of the enrollment transfer by the enrolled client device to the enrollment transfer module 220 in order to confirm authorization of the transfer. In other embodiments, the enrolled client device 130, the non-enrolled client device 130, or the enrollment transfer module 220 can perform similar processes to initiate the transfer process as those described above using other types of device-to-device communication protocols (e.g., near-field communication (NFC)) or other networks (e.g., a local area network, wide area network, etc.). Relevant embodiments are described in greater detail below with reference to FIG. 3.

In the same or different embodiments, the enrollment transfer module 220 provides the enrolled client device 130 with a transfer authorization token in response to receiving an enrollment transfer request from the enrolled client device 130. For example, the enrollment transfer module 220 may provide the enrolled client device 130 with a password (e.g., a one-time password) or a QR code. In this case, the enrollment transfer module 220 obtains new enrollment information from the non-enrolled client device 130 in response to verifying the same transfer authorization token received from the non-enrolled client device 130. As an example, the enrolled client device 130 may provide the transfer authorization token to the non-enrolled client device 130, such as in response to receiving user authorization to do so (e.g., via an interaction with a user interface displayed by the enrolled client device 130). As another example, the enrollment transfer module 220 may provide a password to the enrolled client device and a user associated with the enrolled and non-enrolled client devices may manually provide the password back to the enrollment transfer module 220 using the non-enrolled client device (e.g., via an interaction with a user interface displayed by the non-enrolled client device 130).

In some embodiments, various steps of the enrollment transfer process facilitated by the enrollment transfer module 220 include performing presence verification of a user associated with the enrolled client device 130 or the non-enrolled client device 130. Presence verification can include various processes to solicit input from a user on a client device 130 to verify that the user is the one physically interacting with the client device 130. This presence verification is performed by the enrollment transfer module 220 as a security measure to ensure an authorized user is requesting enrollment transfer (e.g., the user who owns or otherwise operates the enrolled client device 130), and not some other unauthorized person or computer process. The enrollment transfer module 220 may request presence verification from the enrolled client device, the non-enrolled client device, or both, before initiating the enrollment transfer or during the enrollment transfer. For example, the enrolled client device may provide presence information to the enrollment transfer module 220 authorized using authentication credentials of the non-enrolled client device associated with enrollment information for the non-enrolled client device, such as authorized via signing using a private key. In some embodiments, the enrollment transfer module 220 only requests presence verification, or any other form of authentication, from the user on the enrolled client device 130 in order to simplify the user experience in executing the enrollment transfer process. In order to perform presence verification, the enrollment transfer module 220 can request a user associated with the enrolled and non-enrolled client devices 130 provide various presence information, such as a password, MFA authentication factors, biometric information, or other information verifying the presence of a user. In embodiments where the enrollment transfer module 220 requests biometric information, the biometric information can include various types of biometric information the client devices 130 are configured to receive, such as user fingerprint information, user facial imaging information, user iris or retina information, user voice information, or other biometric information. In some embodiments, the enrollment transfer module 220 verifies the received presence information, such as comparing the received presence information to information stored by the authentication system 200 (e.g., in the enrollment information store 230). In the same or different embodiments, the client device 130 that receives the presence information verifies the received presence information (e.g., performs biometric authentication) and conveys the verification to the enrollment transfer module 220.

In some embodiments, the enrollment transfer module 220 provides an interface for customizing presence verification for certain client devices 130 (e.g., client devices associated with an organization). For example, enabling or disabling presence verification, configuring which client devices provider presence verification during the enrollment transfer process, configuring the type or amount of presence information to collect, etc. In this case, the enrollment transfer module 220 may provide an interface to an administrator associated with certain client devices to customize the presence verification for enrollment transfer.

TECHNIQUES FOR TRANSFERRING ENROLLMENT INFORMATION

Figure 3:
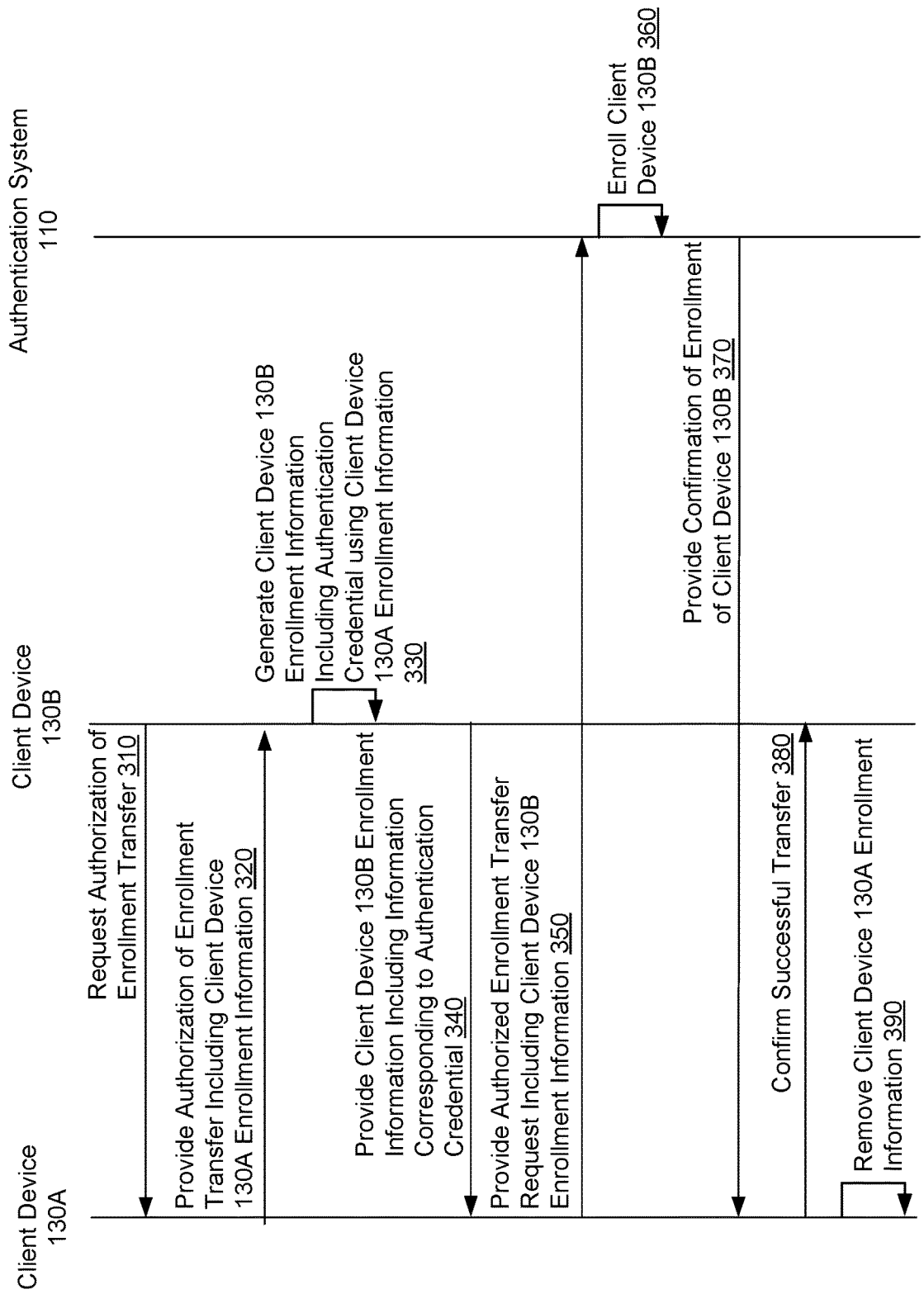
FIG. 3 is a sequence diagram illustrating interactions between an authentication system, an enrolled client device, and a non-enrolled client device to transfer enrollment from the enrolled client device to the non-enrolled client device using a personal area network, according to one embodiment.

FIG. 3 is a sequence diagram illustrating an embodiment of interactions between the authentication system 110, an enrolled client device, and a non-enrolled client device to transfer enrollment from the enrolled client device to the non-enrolled client device using a personal area network. In the embodiment shown in FIG. 3, at the start of the sequence the client device 130A is enrolled in authentication services with the authentication system 110 (i.e., the enrolled device) and the client device 130B is not enrolled (i.e., the non-enrolled client device).

The sequence of interactions depicted in FIG. 3 begins with the non-enrolled client device 130B requesting 310 authorization of an enrollment transfer from the enrolled client device 130A. In particular, the client device 130B connects to the client device 130A via a personal area network (e.g., Bluetooth) and requests authorization of the enrollment transfer using the personal area network. In response to the request for authorization, the client device 130A provides 320 authorization of the enrollment transfer to the client device 130B. In particular, the authorization includes enrollment information of the client device 130A, such as an identifier of enrollment information associated with the client device 130A on the authentication system 110. In some cases, the client device 130A verifies the presence of a user associated with the client devices 130A and 130B in order to authorize the enrollment transfer request (e.g., using biometric authentication). As an example, a user that owns the client device 130A may initiate the enrollment process after acquiring the client device 130B using the above described process.

After receiving authorization from the client device 130A, the client device 130B generates 330 enrollment information for the client device 130B using the enrollment information for the client device 130A included in the authorization, where the new enrollment information includes one or more new authentication credentials for the client device 130B. For instance, the client device 130B may generate a new public/private key pair to be used for authentication through the authentication system 110. The client device 130B provides some of the new enrollment information for the client device 130B to the client device 130A, including information corresponding to an authentication credential of the one or more authentication credentials (e.g., a public key of an MFA certificate of the client device 130B). After receiving the enrollment information for the client device 130B, the client device 130A provides 350 an enrollment transfer request to the authentication system 110 authorized using one or more authentication credentials of the client device 130A (e.g., a private key of the client device 130A), where the enrollment transfer request includes the enrollment information for the client device 130B. The user of the client device 130A may further authorize the enrollment transfer request by providing presence information to the authentication system 110 (e.g., via biometric authentication). Based on the authorized transfer request (e.g., verified by the authentication system 110 using an authentication credential associated with the client device 130A), the authentication system 110 enrolls 360 the client device 130B in authentication services to replace the client device 130A. In particular, the authentication system 110 associates the authentication credential of the client device 130B with enrollment information in place of an authentication credential of client device 130A. For example, the enrollment transfer module 220 may update a public key of an MFA certificate of the client device 130A with a public key of an MFA certificate of the client device 130B (e.g., stored in the enrollment information store 230). After enrolling the client device 130B, the authentication system 110 provides 370 confirmation of the enrollment of the client device 130B to the client device 130A. Based on the confirmation from the authentication system 110, the client device 130B provides 380 confirmation that the transfer was successfully completed to the client device 130B. After confirming the successful transfer, the client device 130A removes 350 the enrollment information of the client device 130A (e.g., removes authentication credentials stored via TPM), thus completing the transfer.

Figure 4:
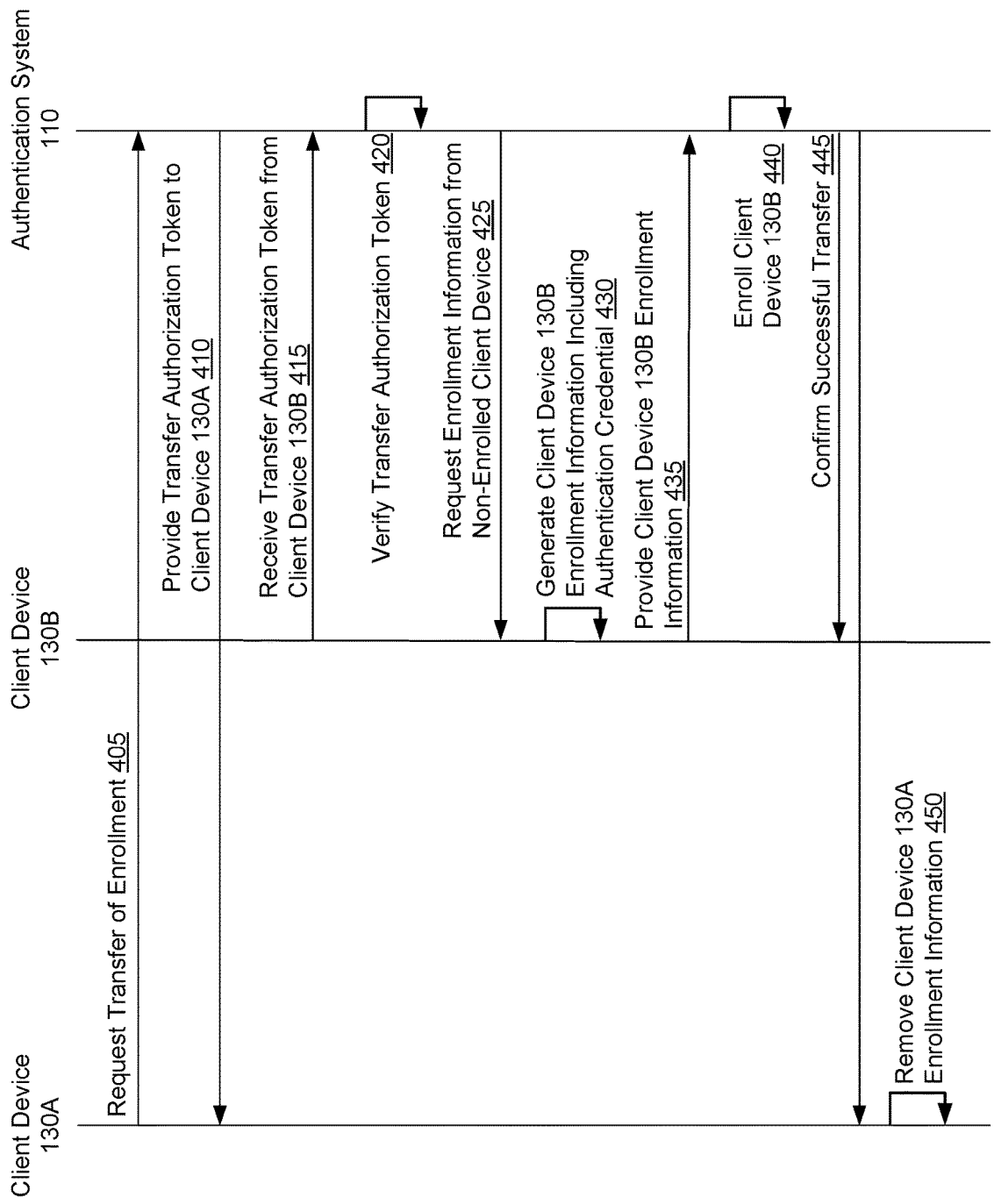
FIG. 4 is a sequence diagram illustrating interactions between an authentication system, an enrolled client device, and a non-enrolled client device to transfer enrollment from the enrolled client device to the non-enrolled client device using a transfer authorization token, according to one embodiment.

FIG. 4 is a sequence diagram illustrating an embodiment of interactions between the client system 110, an enrolled client device, and a non-enrolled client device to transfer enrollment from the enrolled client device from the enrolled client device to the non-enrolled client device using a transfer authorization token. In the embodiment shown in FIG. 4, at the start of the sequence the client device 130A is enrolled in authentication services with the authentication system 110 (i.e., the enrolled device) and the client device 130B is not enrolled (i.e., the non-enrolled client device).

The sequence of interactions depicted in FIG. 4 begins with the client device 130A requesting 405 transfer of enrollment for the client device 130A to the client device 130B by the authentication system 110. The client device 130A may authorize the request for transfer of enrollment using authentication credentials associated with enrollment information of the client device 130A, such as authorized by signing using a private key. In response to the request, the authentication system 110 provides 410 a transfer authorization token to the client device 130A, such as a password or QR code.

After receiving the authorization token, the authentication system 110 receives 415 the transfer authorization token from the client device 130B. For example, the user of the client device 130A may manually submit the authorization token to the authentication system 110 on the client device 130B, or the client device 130A may transmit the authorization token to the client device 130B over a network. The authentication system 110 verifies 420 the transformation authorization token, such as comparing the authorization token to a local copy of the authorization token. After verifying 420 the transfer authorization token, the authentication system 110 requests 425 enrollment information from the non-enrolled client device 130. Based on the request 430, the client device 130B generates 430 new enrollment information for the client device 130B, where the new enrollment information includes one or more authentication credentials for the client device 130B. For instance, the client device 130B may generate a new public/private key pair to be used for authentication through the authentication system 110. The client device 130B provides 435 some of the new enrollment information for the client device 130B to the authentication system 110, including information corresponding to an authentication credential of the one or more generated authentication credential (e.g., a public key from an MFA certificate of the client device 130B). Using the enrollment information for the client device 130B, the authentication system 110 enrolls 440 the client device 130B in authentication services to replace the client device 130A, as described at step 360 of FIG. 3. After enrolling the client device 130B, the authentication system 110 provides 445 confirmation of the enrollment of the client device 130B and the client device 130A. After receiving confirmation of the successful transfer, the client device 130A removes 450 the enrollment information of the client device 130A (e.g., removes authentication credentials stored via TPM), thus completing the transfer.

As such, through the interactions depicted in FIG. 3 or 4, or performed by other processes described herein, the authentication system 110 provides an efficient end-user experience for transferring enrollment in authentication services from an enrolled client device to a non-enrolled client device. For example, using the sequence of interactions depicted in FIG. 3, the interactions performed by a user may be limited to pairing the enrolled client device and the non-enrolled client device via a personal area network and authorizing the transfer on one of the devices (e.g., selecting a "authorize transfer" button on user interfaces of the devices or providing biometric information for biometric authentication). As another example, using the sequence of interactions depicted in FIG. 4, the interactions performed by the user may be limited to requesting a transfer token on the enrolled device and inputting the transfer token on the non-enrolled device. Furthermore, the transfer processes described herein do not necessitate backing up the enrollment information for the enrolled device (e.g., on the authentication system 110) in order to transfer the enrollment information to the non-enrolled device. In contrast, conventional systems would require the user perform more numerous and more complicated steps, such as logging into an account of the user associated with the conventional system and manually adjusting user settings to unenroll the enrolled client device and enroll the non-enrolled client device. As another example, conventional systems might require a user to contact administrators of the conventional system and for the administrators to perform tasks in order to facilitate enrolling the non-enrolled client device.

In other embodiments than those shown in FIG. 3 or FIG. 4, some or all of the steps may be performed by other entities or components. In addition, some embodiments may perform the steps in parallel, perform the steps in different orders, or perform different steps.

EXEMPLARY COMPUTER ARCHITECTURE

Figure 5:
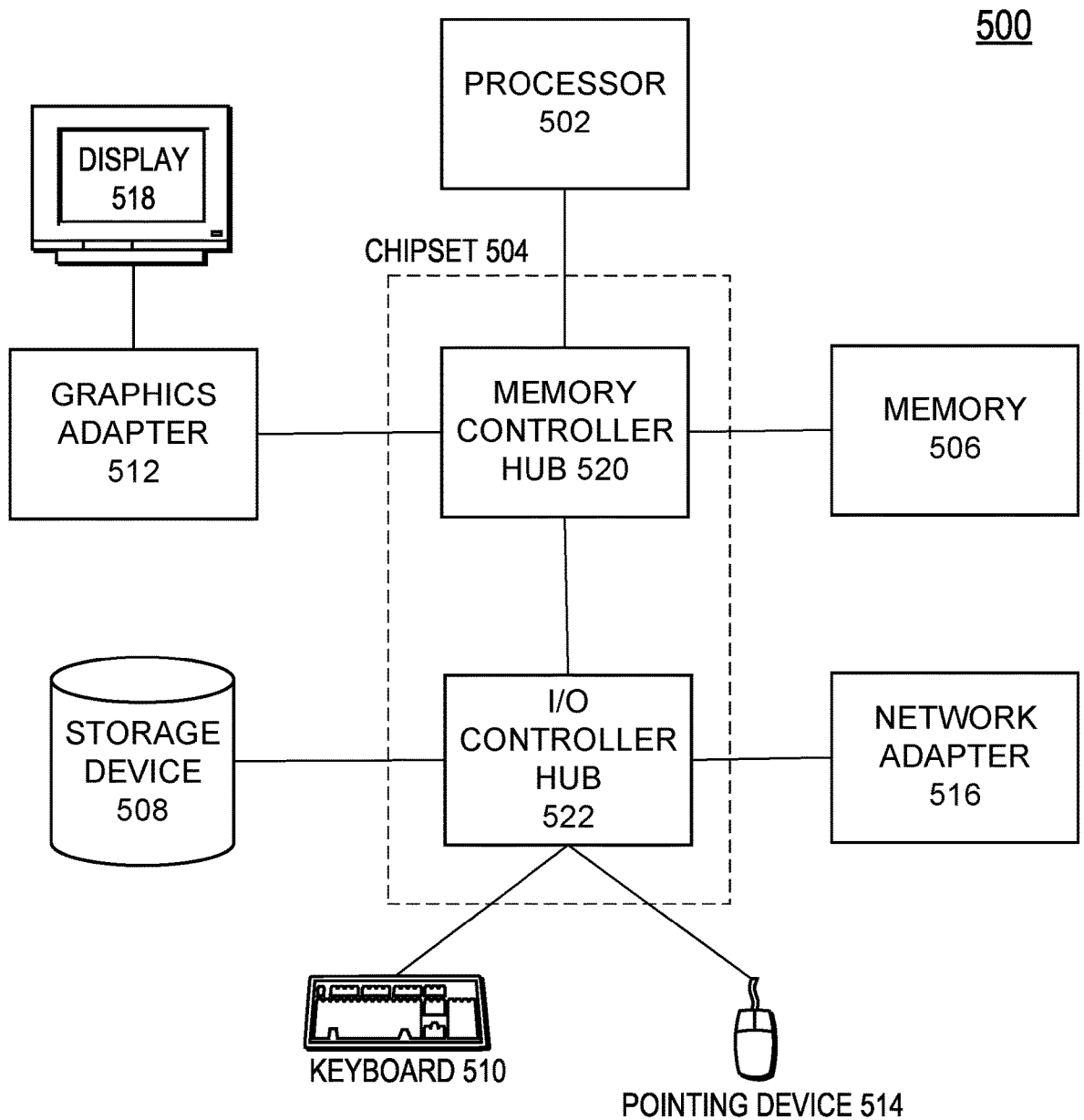
FIG. 5 is a high-level block diagram illustrating physical components of a computer used as part or all of the server, organization, client device of a user, or system providing the third-party application, according to one embodiment.

FIG. 5 is a block diagram illustrating physical components of a computer 500 used as part or all of authentication system 110, the service provider 120, or the client devices 130, in accordance with an embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard 510 or external pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method performed by an authentication system and comprising:
    associating authentication enrollment information of a user with a first client device, wherein the authentication enrollment information is associated with a first authentication credential for authenticating access requests through the authentication system;
    receiving, from the first client device, a request to enroll a second client device associated with the user, wherein authorization of the request is based at least in part on the first authentication credential, and wherein the request includes information corresponding to a second authentication credential provided by the second client device to the first client device;
    associating updated authentication enrollment information with the second client device based at least in part on authorization of the request, wherein the updated authentication enrollment information is associated with at least the second authentication credential; and
    providing, to the first client device, confirmation of enrollment of the second client device.

2. The computer-implemented method of claim 1, further comprising:
    requesting verification of the user via the second client device; and
    receiving, from the second client device, information verifying the user, wherein associating the updated authentication enrollment information with the second client device is based at least in part of the information.

3. The computer-implemented method of claim 1, further comprising:
    responsive to receiving an access request associated with the authentication enrollment information, requesting an authentication factor for authenticating the access request from the second client device; and
    responsive to receiving the authentication factor from the second client device generated using the second authentication credential, authenticating the access request using the authentication factor.

4. The computer-implemented method of claim 1, wherein the request is received from the first client device via a user interface associated with the authentication system.

5. The computer-implemented method of claim 1, wherein the request comprises an enrollment transfer request.

6. The computer-implemented method of claim 1, wherein the first authentication credential is securely stored on the first client device and the second authentication credential is securely stored on the second client device.

7. The computer-implemented method of claim 1, wherein associating the authentication enrollment information with the second client device comprises:
   requesting, from the first client device, presence verification of the user;
   receiving presence information from the first client device verifying presence of the user; and
   associating the authentication enrollment information with the second client device based at least in part of the presence information.

8. The computer-implemented method of claim 6, wherein the first authentication credential is stored on the first client device using a first trusted platform module (TPM) of the first client device and the second authentication credential is stored on the second client device using a second trusted platform module (TPM) of the second client device.

9. The computer-implemented method of claim 1, further comprising:
   associating the second authentication credential with the authentication enrollment information in place of the first authentication credential based at least in part on the information corresponding to the second authentication credential.

10. The computer-implemented method of claim 1, wherein the first authentication credential is removed from secure storage on the first client device responsive to the confirmation.

11. The computer-implemented method of claim 1, wherein the first authentication credential corresponds to a first multi-factor authentication (MFA) certificate of the first client device and the second authentication credential corresponds to a second MFA certificate of the second client device.

12. A computer-implemented method performed by an authentication system and comprising:
   associating authentication enrollment information with a first client device associated with a user, wherein the authentication enrollment information is associated with a first authentication credential for authenticating access requests through the authentication system;
   receiving, from the first client device, a request to enroll a second client device associated with the user;
   providing a transfer authorization token to the first client device in response to receiving the request;
   obtaining, from the second client device, information corresponding to a second authentication credential in response to validating the transfer authorization token;
   updating the authentication enrollment information by associating the second authentication credential with the authentication enrollment information in place of the first authentication credential;
   associating the updated authentication enrollment information with the second client device; and
   providing, to the first client device, confirmation of enrollment of the second client device.

13. A non-transitory computer-readable storage medium comprising executable instructions that when executed by a computer processor cause the computer processor to perform actions comprising:
   associating authentication enrollment information with a first client device associated with a user, wherein the authentication enrollment information is associated with a first authentication credential for authenticating access requests through an authentication system;
   receiving, from the first client device, a request to enroll a second client device associated with the user, wherein authorization of the request is based at least in part on the first authentication credential, and wherein the request includes information corresponding to a second authentication credential provided by the second client device to the first client device;
   associating updated authentication enrollment information with the second client device based at least in part on authorization of the request, wherein the updated authentication enrollment information is associated with at least the second authentication credential; and
   providing, to the first client device, confirmation of enrollment of the second client device.

14. The non-transitory computer-readable storage medium of claim 13, wherein the actions further comprise:
   requesting, from the second client device, verification of the user; and
   receiving information from the second client device verifying the user, wherein associating the updated authentication enrollment information with the second client device is based at least in part of the information.

15. The non-transitory computer-readable storage medium of claim 13, wherein the actions further comprise:
   responsive to receiving an access request associated with the authentication enrollment information, requesting an authentication factor for authenticating the access request from the second client device; and
   responsive to receiving the authentication factor from the second client device generated using the second authentication credential, authenticating the access request using the authentication factor.

16. The non-transitory computer-readable storage medium of claim 13, wherein the request is received from the first client device via a user interface associated with the authentication system.

17. The non-transitory computer-readable storage medium of claim 13, wherein the request comprises an enrollment transfer request.

18. The non-transitory computer-readable storage medium of claim 13, wherein the first authentication credential is securely stored on the first client device and the second authentication credential is securely stored on the second client device.

19. The non-transitory computer-readable storage medium of claim 13, wherein the actions further comprise:
   associating the second authentication credential with the authentication enrollment information in place of the first authentication credential based at least in part on the information corresponding to the second authentication credential.

20. The non-transitory computer-readable storage medium of claim 13, wherein the first authentication credential is removed from secure storage on the first client device responsive to the confirmation.

* * * * *